US006728007B2

(12) United States Patent
Umezawa

(10) Patent No.: US 6,728,007 B2
(45) Date of Patent: Apr. 27, 2004

(54) METHOD OF AND APPARATUS FOR COMPRESSING DISCHARGED STENCIL IN STENCIL PRINTER

(75) Inventor: Kiichiro Umezawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 250 days.

(21) Appl. No.: 10/022,248

(22) Filed: Dec. 20, 2001

(65) Prior Publication Data

US 2003/0117634 A1 Jun. 26, 2003

(30) Foreign Application Priority Data

Dec. 22, 2000 (JP) ....................................... 2000-390067

(51) Int. Cl.$^{7}$ ........................... H04N 1/36; H04N 1/393

(52) U.S. Cl. ........................ 358/420; 358/423; 358/451

(58) Field of Search ............................. 318/53, 58, 59, 318/61, 799; 358/426, 419, 421, 423, 426.01, 412

(56) References Cited

U.S. PATENT DOCUMENTS 4,862,284 A * 8/1989 Murata ....................... 358/451
4,980,623 A * 12/1990 Antone ....................... 318/432
5,327,199 A * 7/1994 Sekine ....................... 355/245
5,345,159 A * 9/1994 Hanamura .................. 318/447
5,520,108 A 5/1996 Hasegawa et al.

FOREIGN PATENT DOCUMENTS

JP 02-175277 A 7/1990
JP 11-180572 * 11/1999 ............ B65H/3/06

* cited by examiner

*Primary Examiner*—Jerome Grant, II
(74) *Attorney, Agent, or Firm*—Nixon Peabody LLP; Donald R. Studebaker

(57) ABSTRACT

Discharged stencils stored in a discharged stencil box of a stencil printer are compressed by a compression member driven by a DC compression motor. The cycle rate of pulses generated from a rotary encoder representing the speed of the compression motor is detected and the compression motor is stopped when the cycle rate of the pulses generated from the rotary encoder becomes equal to a value corresponding to a predetermined desired output torque of the compression motor.

10 Claims, 6 Drawing Sheets

METHOD OF AND APPARATUS FOR COMPRESSING DISCHARGED STENCIL IN STENCIL PRINTER

BACKGROUND OF THE INVENTION

1. Field of the Invention

This invention relates to a method of and apparatus for compressing a discharged stencil in a stencil printer.

2. Description of the Related Art

As disclosed, for instance, in Japanese Unexamined Patent Publication Nos. 2(1990)-175277 and 8(1996)-011416, it has been proposed to discharge used stencils from the printing drum into a discharged stencil box and store the discharged stencils in a compressed state in the discharged stencil box. By compressing the discharged stencils, a larger number of discharged stencils can be stored in the discharged stencil box.

FIG. 3 shows an example of the discharged stencil compression mechanism employed in the conventional stencil printer. As shown in FIG. 3, the conventional discharged stencil compression mechanism of this example comprises a stencil compression plate 11, a motor driven arm 12 which is supported for rotation coaxially with the stencil compression plate 11 and is connected to the stencil compression plate 11 by way of a spring 13, and a DC motor 18 which drives the motor driven arm 12 under the control of a CPU 16 by way of a motor driver IC. When the discharged stencils are to be compressed, the CPU 16 starts the motor 18 to rotate the motor driven arm 12 in the counterclockwise direction, whereby the stencil compression plate 11 is pressed against the discharged stencils pulled by the motor driven arm 12 stretching the spring 13. The CPU 16 detects the length of the spring 13 on the basis of signals from sensors (not shown) and stops the motor 18 when the length of the spring 13 becomes equal to the value corresponding to a predetermined compression torque. In this manner, the discharged stencils are compressed under a predetermined compression torque. The motor driven arm 12 is provided with an actuator piece 12*a* which turns off a limit switch 14 when the motor driven arm 12 is rotated over a predetermined angle, thereby limiting the maximum rotating angle of the motor driven arm 12. Further, the CPU 16 counts the number of the encoder pulses output from the rotary encoder 18, which represents the amount of rotation of the motor 18, thereby detecting the amount of compressed stencil in the discharged stencil box 15.

In the conventional discharged stencil compression mechanism, the load on the CPU can become excessive since the CPU must count the number of the encoder pulses output from the rotary encoder 18 and carry out sequence control for stencil making as well as detecting the compression torque. To employ a high-performance CPU conforming to the heavy load adds to the cost and is economically disadvantageous. Further, after a long use, the spring becomes weak and the relation between the length of the spring and the force applied thereto changes, which results in fluctuation in the measured compression torque and malfunction of the discharged stencil compression mechanism.

SUMMARY OF THE INVENTION

In view of the forgoing observations and description, the primary object of the present invention is to provide a method of and apparatus for compressing a discharged stencil which can accurately detect the compressive force on the discharged stencils without increasing the load on the CPU.

In accordance with a first aspect of the present invention, there is provided a method of compressing discharged stencils by a compression member driven by a DC compression motor to compress the discharged stencils, the method comprising the steps of detecting the cycle rate of pulses generated from a rotary encoder representing the speed of the compression motor and stopping the compression motor when the cycle rate of the pulses generated from the rotary encoder becomes equal to a value corresponding to a predetermined desired output torque of the compression motor.

As is well known, the rotary encoder is provided on an output shaft of the compression motor or a member driven by the output shaft of the compression motor, and the cycle rate of the pulses generated from the rotary encoder represents the speed of the compression motor. Since the compression motor is a DC motor, the output torque linearly changes with the speed (the number of rotations per unit time) of the motor, and accordingly, the output torque of the compression motor (proportional to the compressive force on the discharged stencils) can be detected from the cycle rate of the encoder pulses.

Since, for example, there is a time lag between the time the compression motor is stopped and the time the compressive force on the stencils is actually released, the time the compression motor is stopped need not be the end of the stencil compression step.

In order to easily and efficiently detect the cycle rate of the rotary encoder pulses, it is preferred that reference clocks be generated and the cycle rate of the rotary encoder pulses be detected by counting the number of the reference clock pulses generated in one cycle of the rotary encoder pulses.

In this case, that the cycle rate of the pulses generated from the rotary encoder becomes equal to the value corresponding to the predetermined desired output torque of the compression motor may be detected on the basis of the cycle rate of the rotary encoder pulses obtained by converting the number of the reference clocks generated in one cycle of the rotary encoder pulses to the cycle rate of the rotary encoder pulses, or may be detected directly on the basis of the number of the reference clocks generated in one cycle of the rotary encoder pulses without converting the number of the reference clocks generated in one cycle of the rotary encoder pulses to the cycle rate of the rotary encoder pulses.

In accordance with a second aspect of the present invention, there is provided a discharged stencil compressing apparatus for a stencil printer comprising a compression member driven by a DC compression motor to compress the discharged stencils, a rotary encoder which generates pulses representing the speed of the compression motor, a compression detecting means which detects the cycle rate of the pulses generated from the rotary encoder and generates a detecting signal when detecting that the cycle rate of the pulses generated from the rotary encoder becomes equal to a value corresponding to a predetermined desired output torque of the compression motor, and a control means which stops the compression motor upon receipt of the detecting signal from the compression detecting means.

The CPU for controlling the stencil printer may double as the control means of the discharged stencil compressing apparatus.

In order to easily and efficiently detect the cycle rate of the rotary encoder pulses, it is preferred that the compression detecting means be provided with a reference clock generator which generates reference clocks and an encoder pulse cycle measuring means which measures the cycle rate of the rotary encoder pulses by counting the number of the reference clock pulses generated in one cycle of the rotary encoder pulses.

In accordance with the present invention, since whether the compressive force applied to the discharged stencils reaches a predetermined value is detected on the basis of the cycle rate of the rotary encoder pulses, malfunction of the discharged stencil compression mechanism and/or measuring errors due to change of the relation between the length of the spring and the force applied thereto due to deterioration with time of the spring can be prevented.

Further, since it is not necessary to detect the length of the spring, the load on the CPU can be lightened, and accordingly, the discharged stencil compression mechanism can be produced at low cost.

DESCRIPTION OF THE PREFERRED EMBODIMENTS

Figure 1A:
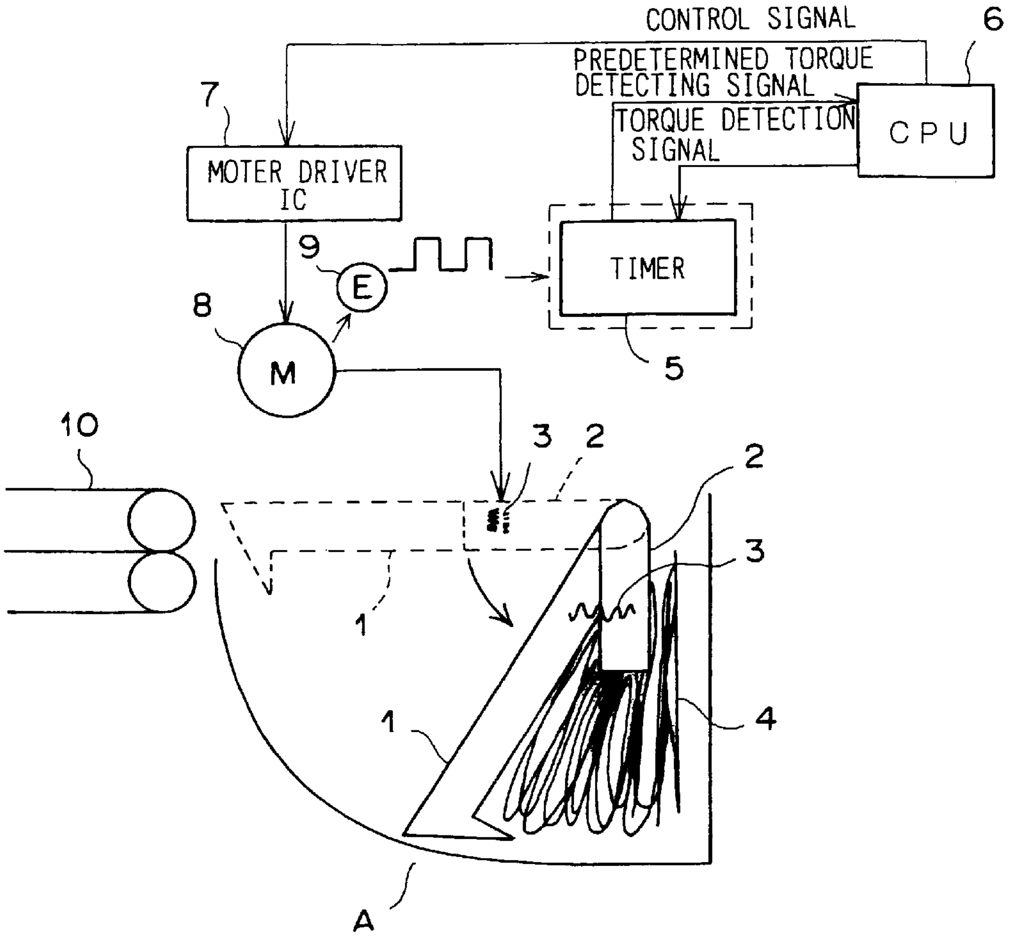
FIG. 1A is a schematic view showing a discharged stencil compression mechanism for a stencil printer in accordance with an embodiment of the present invention.

As shown in FIG. 1A, a stencil 4 is removed from a printing drum (not shown) and is discharged into a discharged stencil box A by a stencil discharge belt 10. Upon receipt of a signal prompting to compress the discharged stencils 4 from a CPU 6, a motor driver IC 7 starts a compression motor 8 to rotate a motor-driven member 2 in the counterclockwise direction. As the motor-driven member 2 is rotated in the counterclockwise direction, a stencil compression plate 1 connected to the motor-driven member 2 by way of a spring 3 is rotated also in the counterclockwise direction to compress the discharged stencils 4. The compression motor 8 is provided with a rotary encoder 9 which outputs to a timer 5 encoder signals at a rate corresponding to the speed of the compression motor 8.

Figure 1B:
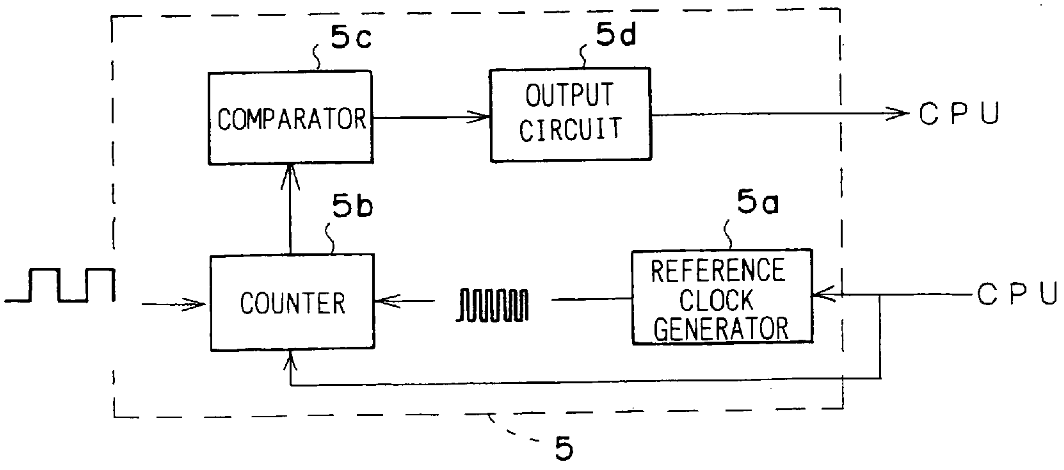
FIG. 1B is a schematic view showing the structure of the timer employed in the discharged stencil compression mechanism shown in FIG. 1A.

FIG. 1B shows the structure of the timer 5. As shown in FIG. 1B, the timer 5 comprises a reference clock generator 5*a*, a counter 5*b* which counts the number of the reference clocks, a comparator 5*c* and an output circuit 5*d* which outputs the result of comparison by the comparator 5*c*.

Upon output of the signal prompting to compress the discharged stencils 4 from the CPU 6 to the motor driver IC 7, the timer 5 causes the reference clock generator 5*a* to start generating the reference clocks and the reference clocks are input into the counter 5*b*. The counter 5*b* counts the number of the reference clocks generated in one cycle of the encoder pulses and outputs the number of the reference clocks to the comparator 5*c*. The comparator 5*c* compares the number of the reference clocks generated in one cycle of the encoder pulses as counted by the counter 5*b* with a threshold value corresponding to a predetermined desired output torque of the compression motor 8 and outputs a compression end signal to the CPU 6 through the output circuit 5*d*. The predetermined desired output torque is a torque such as to drive the compression plate 1 to press the discharged stencils 4 with a desired compression force. The CPU 6 causes the motor driver IC 7 to stop the compression motor 8 upon receipt of the compression end signal from the timer 5.

Operation of the timer 5 will be described in more detail, hereinbelow.

Figure 5:
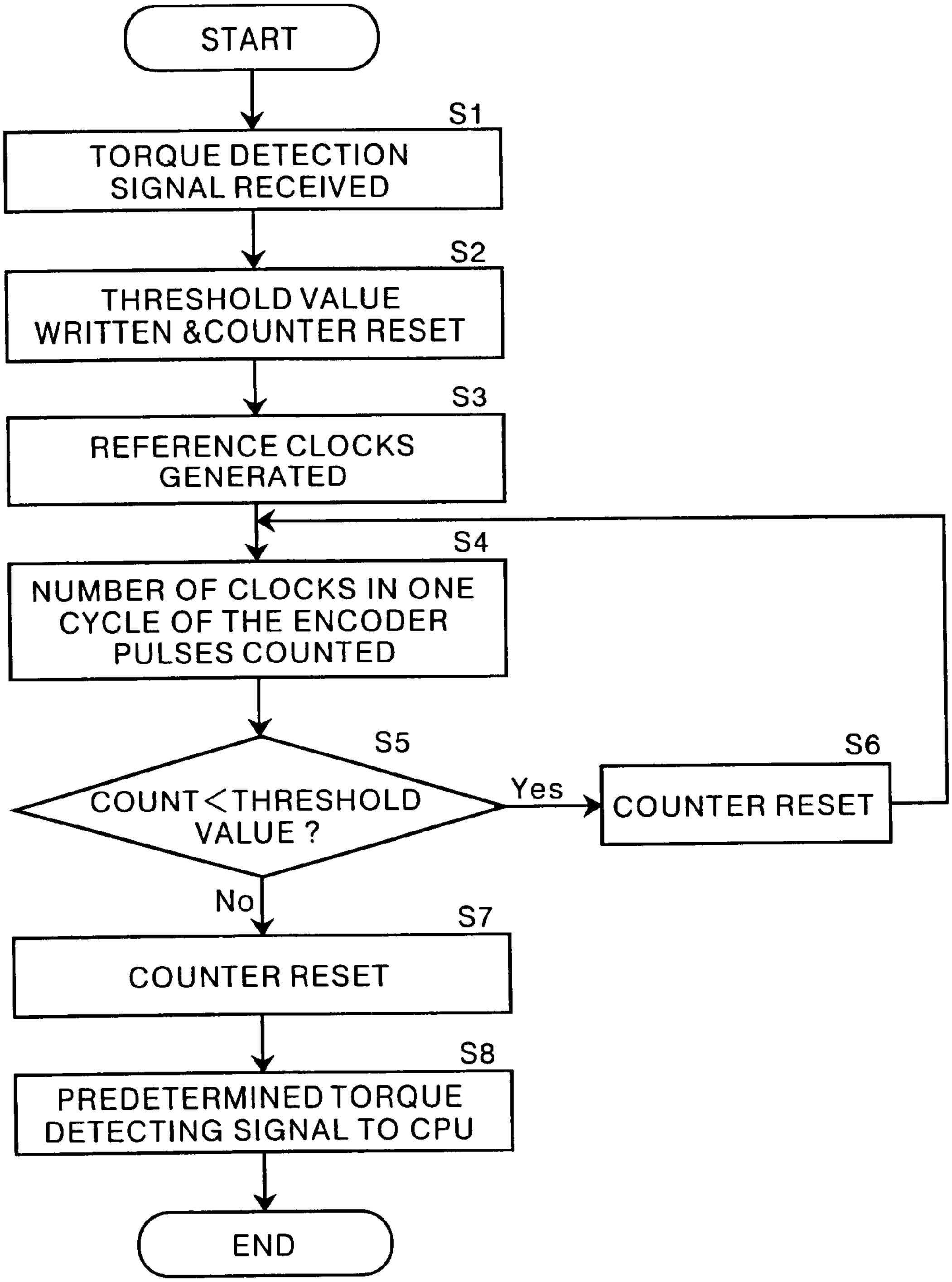
FIG. 5 is a flow chart for illustrating operation of the timer shown in FIG. 1B.

As shown in FIG. 5, upon receipt of a torque detection signal prompting to detect the output torque of the compression motor 8 from the CPU 6 (step S1), the timer 5 writes the number of the reference clocks corresponding to a predetermined desired output torque of the compression motor 8, which has been calculated in advance, in the comparator 5*c* as a threshold value and at the same time, resets the counter 5*b* (step S2) Then the reference clock generator 5*a* starts to output the reference clocks to the counter 5*b*(step S3). The counter 5*b* receives both the encoder pulses and the reference clocks and outputs the number of the reference clocks generated in one cycle of the encoder pulses to the comparator 5*c*(step S4). The comparator 5*c* compares the number of the reference clocks generated in one cycle of the encoder pulses as input from the counter 5*b* with the threshold value (step S5). When the number of the reference clocks generated in one cycle of the encoder pulses as input from the counter 5*b* becomes not smaller than the threshold value, the counter 5*b* is reset (step S7) and a predetermined torque detecting signal is output to the CPU 6 (step S8). Until the number of the reference clocks generated in one cycle of the encoder pulses as input from the counter 5*b* becomes not smaller than the threshold value, the counter 5*b* is reset (step S6) each time it is determined that the former is smaller than the latter and steps S4 and S5 are repeated.

By thus detecting the output torque of the compression motor 8 on the basis of the cycle rate of the encoder pulses and controlling the discharged stencil compression mechanism on the basis of the output torque of the compression motor 8, the compressive force applied to the discharged stencils 4 from the compression plate 1 can be accurately controlled irrespective of the length of the spring 3, the relation with the compressive force of which changes with change of the strength of the spring 3 with time. Further, since the CPU 6 need not measure the length of the spring 3, the load on the CPU 6 is lightened.

Figure 6:
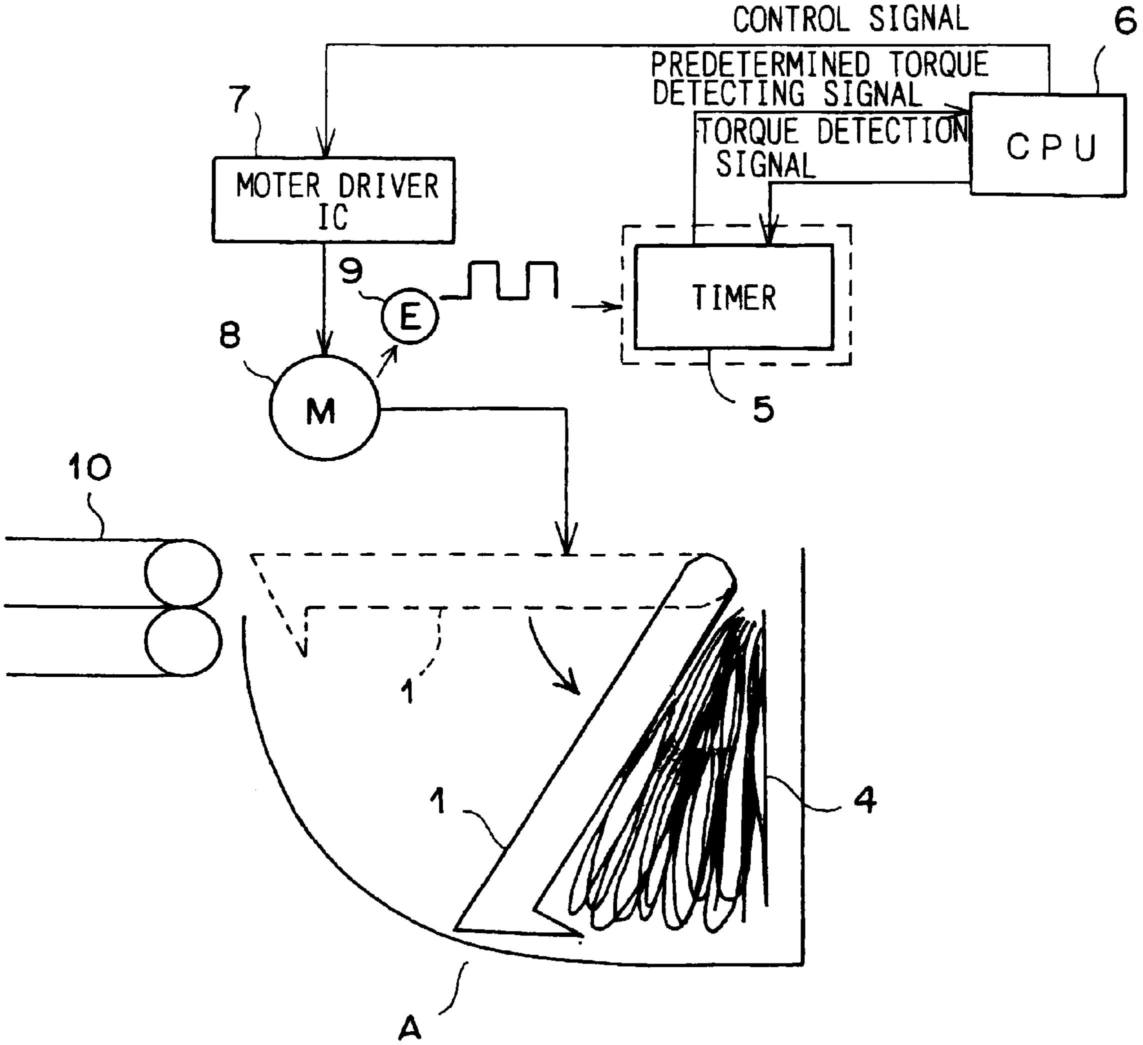
FIG. 6 is a schematic view showing a discharged stencil compression mechanism for a stencil printer in accordance with another embodiment of the present invention.

Though, in the embodiment described above, the compression member is in the form of the compression plate 1 supported to be rotated about the upper end thereof, the compression member may be in any form so long as it can compress the discharged stencils 4. For example, the compression member may be in the form of a compression plate supported to be rotated about the lower end thereof or to be linearly moved back and forth toward and away from the discharged stencils 4. Further, though, in the embodiment described above, the compression motor 8 is connected to the compression plate 1 via the motor driven member 2 and the spring 8, the compression motor 8 may be directly connected to the compression plate 1 as shown in FIG. 6. In this case, since the motor driven member 2 and the spring 3 become unnecessary, the structure of the apparatus can be more simplified.

Figure 2:
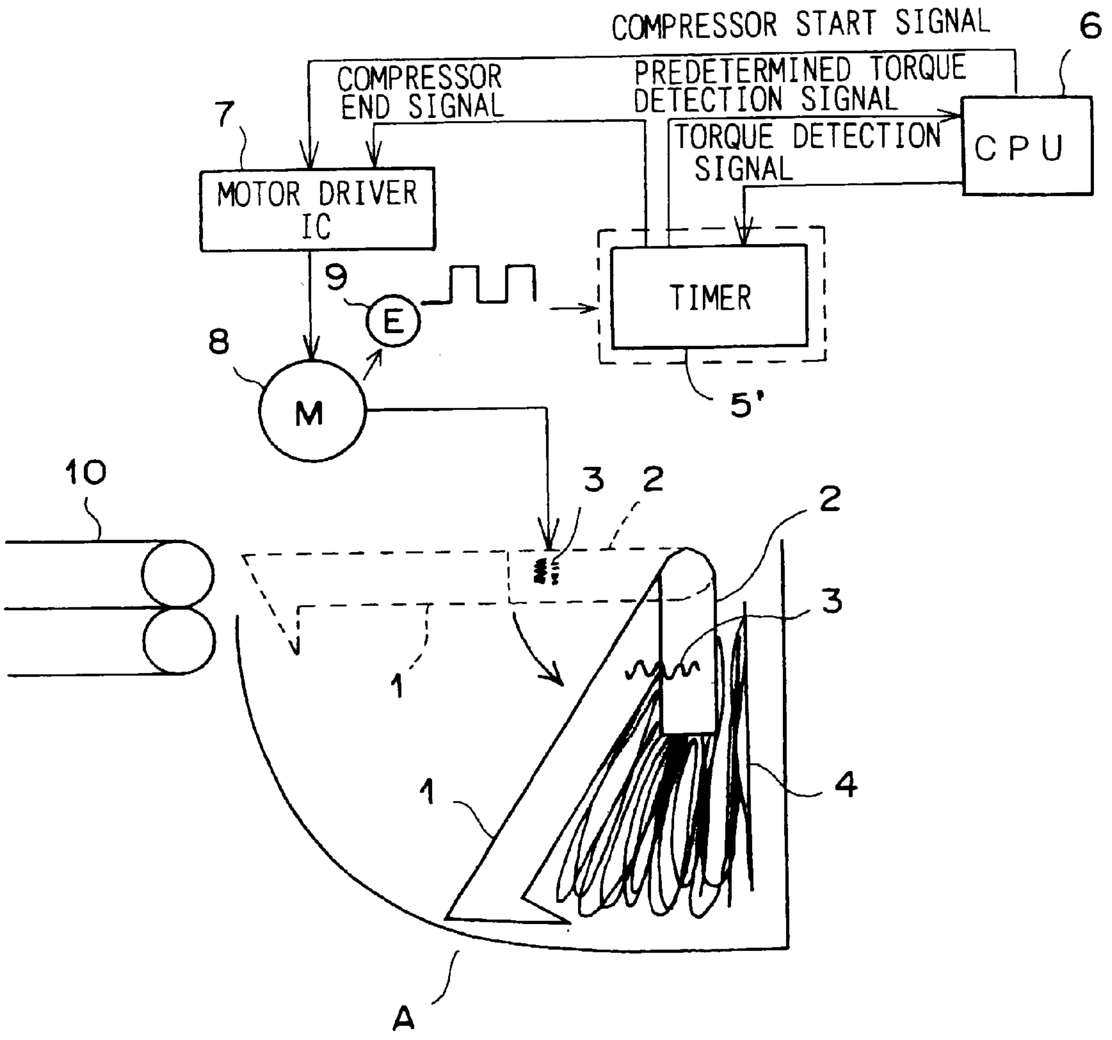
FIG. 2 is a schematic view showing a discharged stencil compression mechanism for a stencil printer in accordance with another embodiment of the present invention.
Figure 3:
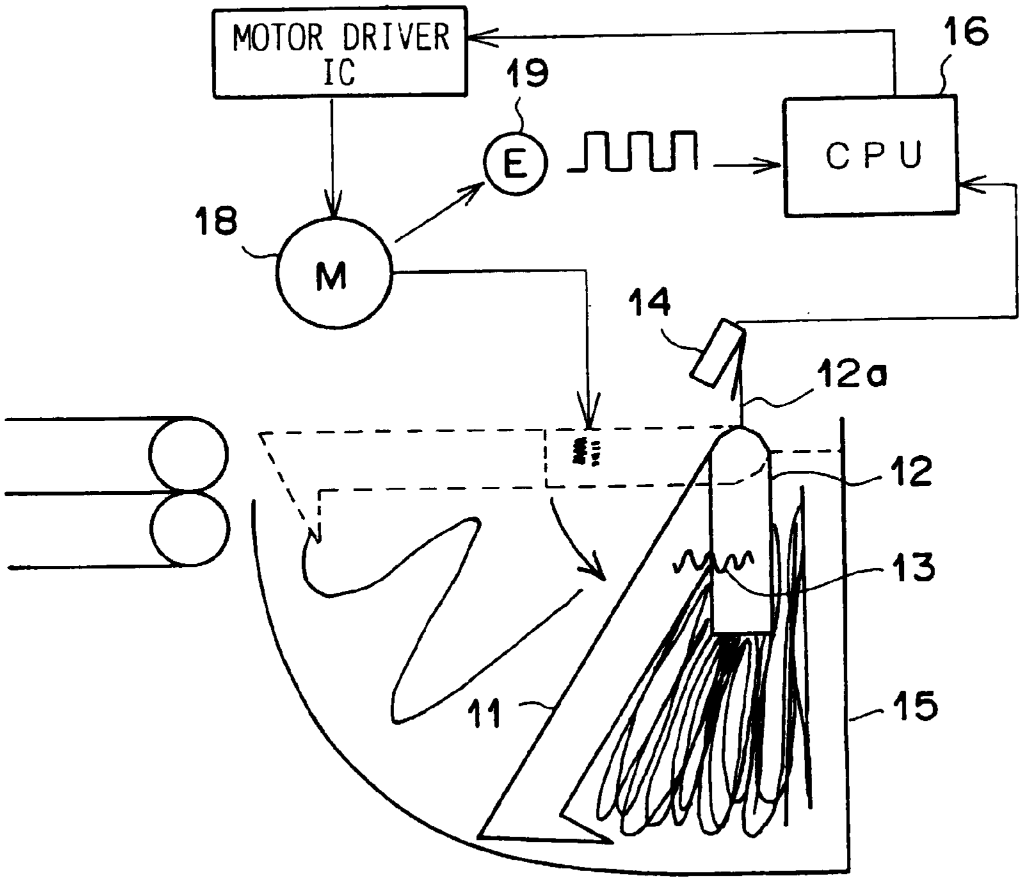
FIG. 3 is a schematic view showing a conventional discharged stencil compression mechanism for a stencil printer.
Figure 4:
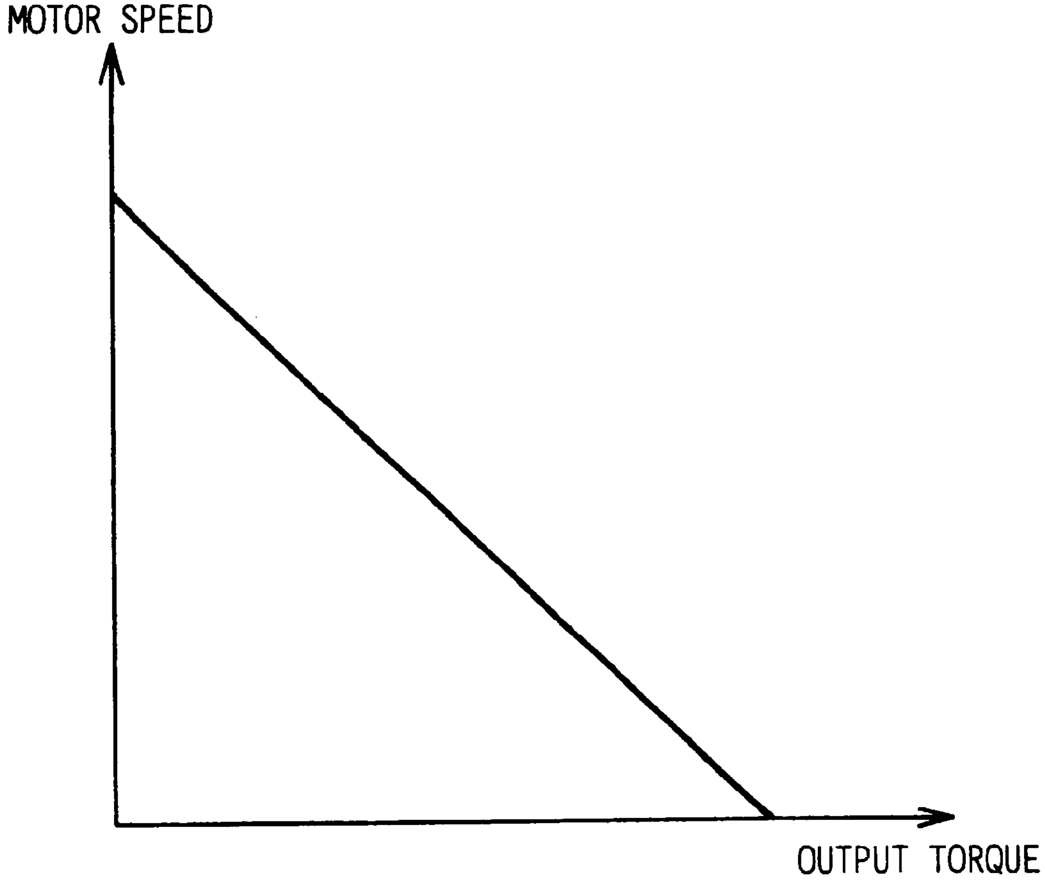
FIG. 4 is a view showing the relation between the speed of the compression motor and the output torque thereof.

Further, it is possible to arrange the discharged stencil compression apparatus so that the timer 5 directly controls the motor driver IC 7 to stop the compression motor 8 as shown in FIG. 2. With this arrangement, since the CPU 6 need not control the motor driver IC 7 to stop the compression motor 8, the load on the CPU 6 is further lightened.

Though in the embodiment described above, the output torque of the compression motor 8, i.e., the speed of the compression motor 8 is detected by counting the number of the reference clocks generated in one cycle of the encoder pulses, if desired, the output torque or the speed of the compression motor 8 may be detected by counting the number of the reference clocks generated in two or more cycles of the encoder pulses. In this case, the threshold value should be determined taking into account the number of cycles of the encoder pulses over which the number of reference clocks are counted.

What is claimed is:

1. A method of compressing discharged stencils by a compression member driven by a DC compression motor to compress the discharged stencils, the method comprising the steps of detecting the cycle rate of pulses generated from a rotary encoder representing the speed of the compression motor and stopping the compression motor when the cycle rate of the pulses generated from the rotary encoder becomes equal to a value corresponding to a predetermined desired output torque of the compression motor.

2. A method as defined in claim 1 in which the compression member is in the form of a compression plate supported to be rotated about its upper or lower end.

3. A method as defined in claim 2 in which the compression plate is rotated toward the discharged stencils pulled by a motor driven member which is rotated by the compression motor and is connected to the compression plate by a spring.

4. A method as defined in claim 1 in which the compression member is supported to be linearly moved back and forth toward and away from the discharged stencils.

5. A method as defined in claim 1 in which the step of detecting the cycle rate of pulses generated from a rotary encoder representing the speed of the compression motor involves generating reference clocks and counting the number of the reference clocks generated in a predetermined number of cycles of the pulses generated from the rotary encoder.

6. A discharged stencil compressing apparatus for a stencil printer comprising a compression member driven by a DC compression motor to compress the discharged stencils, a rotary encoder which generates pulses representing the speed of the compression motor, a compression detecting means which detects the cycle rate of the pulses generated from the rotary encoder and generates a detecting signal when detecting that the cycle rate of the pulses generated from the rotary encoder becomes equal to a value corresponding to a predetermined desired output torque of the compression motor, and a control means which stops the compression motor upon receipt of the detecting signal from the compression detecting means.

7. A discharged stencil compressing apparatus as defined in claim 6 in which the compression member is in the form of a compression plate supported to be rotated about its upper or lower end.

8. A discharged stencil compressing apparatus as defined in claim 7 in which the compression plate is rotated toward the discharged stencils pulled by a motor driven member which is rotated by the compression motor and is connected to the compression plate by a spring.

9. A discharged stencil compressing apparatus as defined in claim 6 in which the compression member is supported to be linearly moved back and forth toward and away from the discharged stencils.

10. A discharged stencil compressing apparatus as defined in claim 6 in which the compression detecting means comprises a reference clock generator and a pulse rate measuring means which measures the cycle rate of pulses generated from a rotary encoder by counting the number of the reference clocks generated in a predetermined number of cycles of the pulses generated from the rotary encoder.

* * * * *